US011449554B2

(12) United States Patent
Juarez et al.

(10) Patent No.: US 11,449,554 B2
(45) Date of Patent: Sep. 20, 2022

(54) EXTENSIBLE SEARCH SOLUTION FOR ASSET INFORMATION

(71) Applicant: McAfee, LLC, Santa Clara, CA (US)

(72) Inventors: Hector R. Juarez, Cordoba (AR); Diego N. Pamio, Cordoba (AR)

(73) Assignee: McAfee, LLC, San Jose, CA (US)

( * ) Notice: Subject to any disclaimer, the term of this patent is extended or adjusted under 35 U.S.C. 154(b) by 627 days.

(21) Appl. No.: 15/299,066

(22) Filed: Oct. 20, 2016

(65) Prior Publication Data

US 2018/0113927 A1  Apr. 26, 2018
US 2019/0018890 A9  Jan. 17, 2019

Related U.S. Application Data

(60) Provisional application No. 62/245,144, filed on Oct. 22, 2015.

(51) Int. Cl.

| G06F 16/903 | (2019.01) |
|---|---|
| G06F 16/9032 | (2019.01) |
| H04L 9/40 | (2022.01) |
| G06F 21/56 | (2013.01) |
| G06F 16/332 | (2019.01) |
| G06F 16/9038 | (2019.01) |
| G06F 16/9035 | (2019.01) |

(52) U.S. Cl.
CPC ........ G06F 16/903 (2019.01); G06F 16/3322 (2019.01); G06F 16/9035 (2019.01); G06F 16/9038 (2019.01); G06F 16/90324 (2019.01); G06F 16/90344 (2019.01); G06F 21/56 (2013.01); H04L 63/145 (2013.01); H04L 63/1425 (2013.01)

(58) Field of Classification Search
CPC ............... G06F 16/903; G06F 16/3322; G06F 16/9038; G06F 16/9035; G06F 16/90344; G06F 16/90324; H04L 63/1425
See application file for complete search history.

(56) References Cited

U.S. PATENT DOCUMENTS

| 8,700,643 | B1 * | 4/2014 | Gossweiler, III | .. H04N 21/4828 |
|---|---|---|---|---|
| | | | | 707/754 |
| 2002/0152222 | A1 * | 10/2002 | Holbrook | ................ G06Q 40/04 |
| 2004/0194141 | A1 * | 9/2004 | Sanders | ............. H04N 5/44543 |
| | | | | 725/53 |
| 2005/0228780 | A1 * | 10/2005 | Diab | .................. G06Q 30/0256 |

(Continued)

Primary Examiner — Alford W Kindred
Assistant Examiner — Lin Lin M Htay
(74) Attorney, Agent, or Firm — Byrne Poh LLP

(57) ABSTRACT

A system for extensible search includes a processor, non-transitory machine readable storage medium communicatively coupled to the processor, and a search application. The search application includes computer-executable instructions on the medium that are readable by the processor. The search application is configured to accept a search string, parse the search string to determine a category of data to be searched and determine a filter of results of a search, recommend a suggested search string based on the accepted search string and a previous search, accept selection of the suggested search string, modify the search string in response to acceptance of the suggested search string, and perform the search of the contents and settings of the plurality of clients for the category of data as limited by at least the filter.

20 Claims, 10 Drawing Sheets

(56) References Cited

U.S. PATENT DOCUMENTS

| | | | |
|---|---|---|---|
| 2008/0059462 A1* | 3/2008 | Millett | G06F 16/2264 |
| 2010/0010968 A1* | 1/2010 | Redlich | G06Q 10/00 |
| | | | 707/E17.014 |
| 2011/0191533 A1* | 8/2011 | Coulter | G06Q 10/00 |
| | | | 711/112 |
| 2012/0143873 A1* | 6/2012 | Saadat | G06F 16/2228 |
| | | | 707/741 |
| 2014/0223099 A1* | 8/2014 | Kidron | G06F 12/0806 |
| | | | 711/118 |
| 2014/0369351 A1* | 12/2014 | Singh | H04L 49/552 |
| | | | 370/390 |
| 2015/0106663 A1* | 4/2015 | Richter | G06F 11/3476 |
| | | | 714/45 |
| 2016/0381121 A1 | 12/2016 | Costantino et al. | |

\* cited by examiner

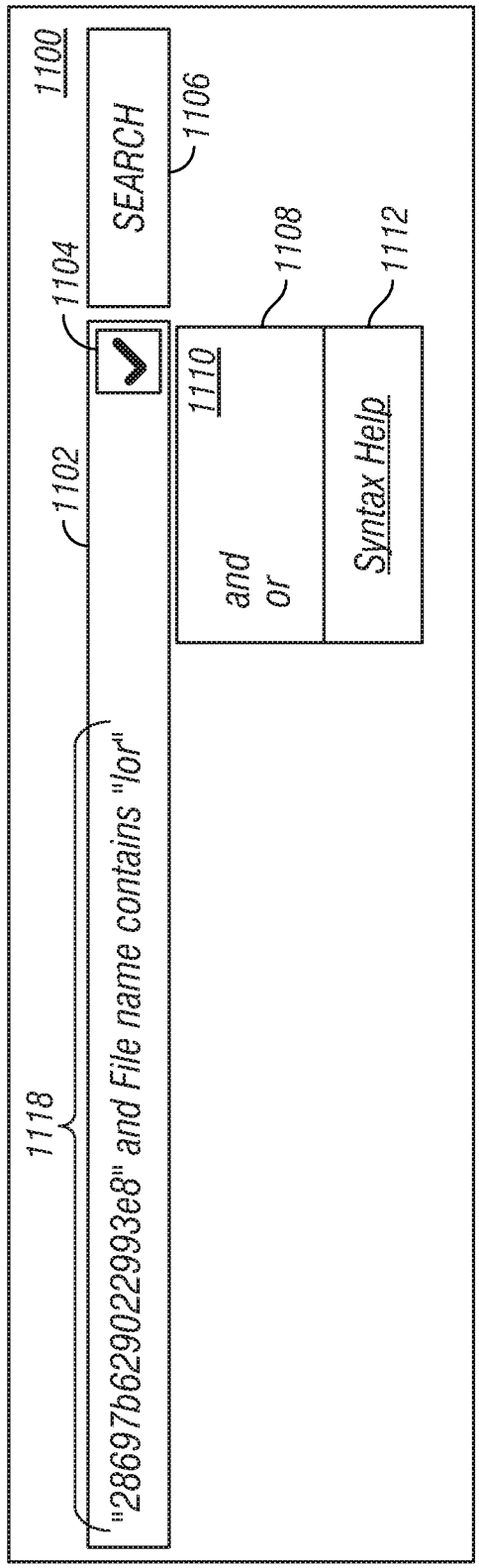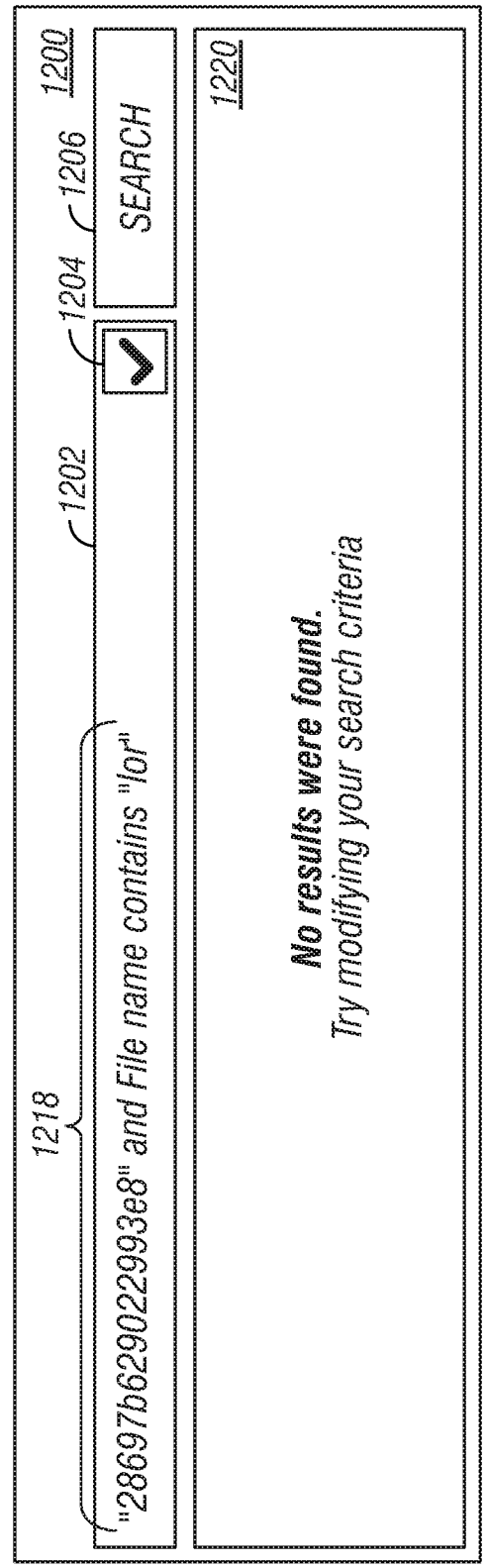

EXTENSIBLE SEARCH SOLUTION FOR ASSET INFORMATION

CROSS-REFERENCE TO RELATED APPLICATIONS

This application claims priority from U.S. Provisional Application No. 62/245,144 filed Oct. 22, 2015, entitled "Extensible Search Solution For Asset Information," the contents of which are incorporated herein by reference.

TECHNICAL FIELD

The present invention relates generally to electronic device security and, more particularly, to an extensible search solution for asset information.

BACKGROUND

Traditional anti-virus and anti-malware solutions, besides being reactive in nature, are unable to cope with the exponential growth in malware attacks. Malware attacks are becoming more sophisticated and easily capable of subverting current solutions. Target attacks may be silent in nature and infect fewer machines, thus decreasing the odds that solution providers will see the particular attacks. Anti-malware solutions address single vectors of attack or single sets of data.

BRIEF DESCRIPTION OF THE DRAWINGS

FIG. 11 is an illustration of autocomplete and suggestions for an exemplary user selection of a suggested input, according to embodiments of the present disclosure;

FIG. 12 is an illustration of the results of an exemplary search in which no search result is found, according to embodiments of the present disclosure.

DETAILED DESCRIPTION OF EMBODIMENTS OF THE INVENTION

Figure 1:
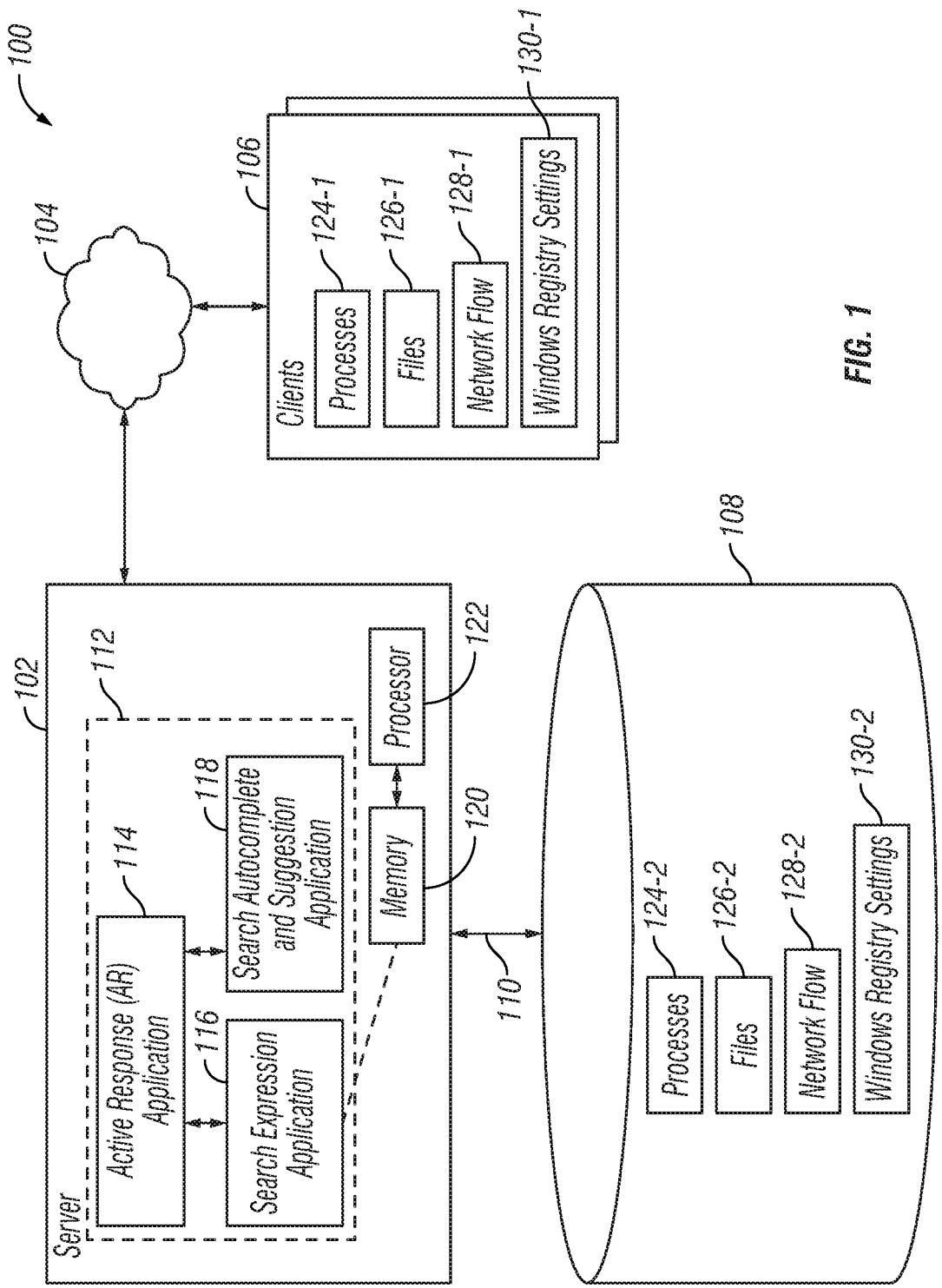
FIG. 1 is an example embodiment of a system for an extensible search solution for asset information, according to embodiments of the present disclosure.

The following description describes an extensible search solution for asset information. Incident responders or administrators may require visibility of endpoints or clients to address advanced threat attacks by searching for vulnerabilities or identifying potential threats in a proactive manner, and to detect post-exploit activities of threats. Incident responders may address advanced threat attacks by using a search solution. The search solution may be extensible to adapt and customize data elements to retrieve custom or new types of data. Moreover, the search solution may autocomplete search entries and recommend suggested search text entries to provide usability without knowledge or familiarity of the system. Furthermore, the search solution may correlate information from different data domains and provide filtering options to assist in identification of advanced threats.

Throughout this disclosure, unless explicitly stated otherwise, a compound form of a reference numeral refers to the element generically or collectively. Thus, for example, widget 101A or 101-1 refers to an instance of a widget class, which may be referred to collectively as widgets 101 and any one of which may be referred to generically as widget 101. Numerous specific details such as processor types, database types, and network types are set forth in order to provide a more thorough understanding of the embodiments of the present disclosure. It will be appreciated, however, by one skilled in the art that embodiments may be practice without such specific details.

FIG. 1 is an example embodiment of a system 100 for an extensible search solution for asset information, according to embodiments of the present disclosure. System 100 may support searching asset information of various clients or endpoints 106. The search solution may be provided at any suitable portion of the system, such as at a server 102. Server 102 may be communicatively coupled to the various clients 106 through a network 104.

Server 102 may include any components suitable for searching aspects of clients 106, including but not limited to processes 124-1, files 126-1, network flows 128-1, and Windows registry settings 130-1 on clients 106. For example, server 102 may include an active response (AR) application 114. In one embodiment, AR application 114 may query clients 106 about their contents, activities, and/or settings via network 104. In another embodiment, AR application 114 may search various repositories of information about the contents, activities, and/or settings of clients 106, such as database 108 via interface 110. The information about clients 106 may include real-time or historical information about processes 124-2, files 126-2, network flows 128-2, or Windows registry settings 130-2 of the clients 106. Furthermore, server 102 may include sub-functions or other applications to help search the information about the clients 106. For example, server 102 may include a search expression application 116 and a search autocomplete and suggestion application 118.

Database 108 may be implemented in any suitable manner, such as by a relational database, spatial databases, graph databases, or any other suitable data structure. Server 102 may be implemented by, for example, a computer, blade server, mainframe, or other suitable electronic device. Clients or endpoints 106 may be implemented by, for example, a computer, virtual machine, thin client, laptop, mobile device, tablet, or other suitable electronic device. Network 104 may be implemented by a cloud, intranet, private network, WLAN, LAN, VLAN, or other suitable networked configuration of electronic devices. Applications 112 may be implemented by, for example, a module, executable, script, application, function, application programming interface, code, or other suitable entity. Applications 112 may be implemented by instructions in a memory 120 for execution by a processor 122. The instructions, when loaded and executed by processor 122, may perform the functionality of the applications 112 as described in this disclosure.

Portions of system 100 may be implemented in any suitable manner, such as by a program, application, script, function, library, code, software, firmware, hardware, or other mechanisms for carrying out the functionality described herein. System 100 may include a processor 122 communicatively coupled to a memory 120.

Memory 120 may be in the form of physical memory or pages of virtualized memory. Processor 122 may comprise, for example, a microprocessor, microcontroller, digital signal processor (DSP), application specific integrated circuit (ASIC), or any other digital or analog circuitry configured to interpret and/or execute program instructions and/or process data. In some embodiments, processor 122 may interpret and/or execute program instructions and/or process data stored in memory 120. Memory 120 may be configured in part or whole as application memory, system memory, or both. Memory 120 may include any system, device, or apparatus configured to hold and/or house one or more memory modules. Each memory module may include any system, device or apparatus configured to retain program instructions and/or data for a period of time (e.g., computer-readable storage media). Instructions, logic, or data for configuring the operation of the system 100 may reside in memory 120 for execution by the processor 122.

Processor 122 may execute one or more code instruction(s) to be executed by the one or more cores of the processor 122. The processor cores may follow a program sequence of instructions indicated by the code instructions. Each code instruction may be processed by one or more decoders of the processor 122. The decoder may generate as its output a micro operation such as a fixed width micro operation in a predefined format, or may generate other instructions, microinstructions, or control signals which reflect the original code instruction. Processor 122 may also include register renaming logic and scheduling logic, which generally allocate resources and queue the operation corresponding to the convert instruction for execution. After completion of execution of the operations specified by the code instructions, back end logic within processor 122 may retire the instruction. In one embodiment, processor 122 may allow out of order execution but requires in order retirement of instructions. Retirement logic within processor 122 may take a variety of forms as known to those of skill in the art (e.g., re-order buffers or the like). The processor cores of processor 122 are thus transformed during execution of the code, at least in terms of the output generated by the decoder, the hardware registers and tables utilized by the register renaming logic, and any registers modified by the execution logic Program instructions may be used to cause a general-purpose or special-purpose processing system that is programmed with the instructions to perform the operations described above. The operations may be performed by specific hardware components that contain hardwired logic for performing the operations, or by any combination of programmed computer components and custom hardware components. Methods may be provided as a computer program product that may include one or more machine readable media having stored thereon instructions that may be used to program a processing system or other electronic device to perform the methods. The terms "machine readable medium" or "computer readable medium" used herein shall include any medium that is capable of storing or encoding a sequence of instructions for execution by the machine and that cause the machine to perform any one of the methods described herein. The term "machine readable medium" shall accordingly include, but not be limited to, memories such as solid-state memories, optical and magnetic disks. Furthermore, it is common in the art to speak of software, in one form or another (e.g., program, procedure, process, application, module, logic, and so on), as taking an action or causing a result. Such expressions are merely a shorthand way of stating that the execution of the software by a processing system causes the processor to perform an action or produce a result.

Users of the server 102 may include incident responders or other administrators of the system. AR application 114 may provide visibility of the clients or endpoints 106 to allow search for vulnerabilities, identification of threats, and remedial action. AR application 114 may include a graphical user interface (GUI) or other user interface to facilitate the search for asset information. In one embodiment, AR application 114 may enable users to leverage the user interface to search for asset information without forcing users to learn a new language. In another embodiment, AR application 114 may facilitate the search for asset information by including powerful filtering and correlation features.

In one embodiment, AR application 114 may utilize an extensible search expression provided by the search expression application 116. Search expression application 116 may be used to specify what information is to be retrieved. Furthermore, search expression application 116 may be used to specify filtering criteria. In another embodiment, AR application 114 may utilize a smart autocomplete and suggestion application 118 to make the search expression features easier to use.

The extensible search expression provided by search expression application 116 may be composed of denotations of collectors. The collectors may be the components or terms responsible for retrieving data of a given domain from a system. Domains used for detecting threats may include predefined collector sets and customized collector sets. Predefined collector sets may include, for example, collectors for processes 124, files 126, network flows 128, or Windows registry settings 130 of clients 106. Customized collector sets may include collectors created by users of server 102.

Administrators of the system may combine collectors in a search in order to correlate data from clients 106 in system 100. Moreover, administrators may perform fine tuning of the filtering criteria with several comparison operators including, but not limited to a string, number, timestamp, or IP address. Furthermore, administrators may combine operations with logical operators including, but not limited to AND, OR, XOR, or nested operations, which may use parentheses.

The search expression allows the administrator to specify what information should be retrieved from clients or endpoints 106 and to define the filtering criteria. The search expression may include two main sections: a projection and filtering criteria. The projection may specify what information is to be retrieved. The filtering criteria may limit the information that is to be retrieved.

In one embodiment, the search expression may include a projection. The administrator of server 102 may use the projection to specify which collectors and domain information are to be retrieved. For example, the search expression may be "processes name, id," which may be for retrieving the name and identification (ID) information of all processes from all endpoints or clients 106 which may be running. "Processes," "name," and "id" may be keywords for the search request. In another example, the search expression may be "processes," which may be for retrieving all processes from the endpoints or clients 106. The specific identification retrieved or returned by such a search may be based upon a default value. For example, by default, a name, image file, MD5 hash, SHA1 hash, command line string, or other identifier of each such process may be retrieved or returned. In yet another example, the search expression may be "HostInfo hostname, ip_address and processes name," which may combine a search for processes in operation, grouped by system or host, with a search for the hostname and IP address(es). "HostInfo," "hostname," "ip_address," "processes," and "name" may be keywords for the search request. Although specific examples of keywords are used throughout this disclosure, any keywords suitable for a search expression may be used.

In another embodiment, the search expression may include filtering criteria which the administrator of server 102 may specify using filtering expressions for collector information, which may narrow the overall search result. For example, a search expression may be "file md5 equals 'xyz.'" AR application 116 may return a default indicator or information of a file with a specific MD5 hash value of "xyz."

In a further embodiment, the search expression may include a projection and filtering criteria. The administrator of server 102 may delineate or separate the specification of the projection and from the specification the filtering criteria using a keyword, such as "where." For example, a search expression may be "processes name where Process name contains 'xyz' or File md5 equals 'zzz.'" Search expression application 116 may retrieve or get the name of running processes from all clients 106, in which either the process is running with a name containing an "xyz" substring or there is a file with an MD5 hash value equivalent to "zzz." "Processes," "name," "Process," "name," "contains," "File," "md5," and "equals" may be keywords for the search request. In another example, the search expression may be "file dir and processes name, image_name where Processes image_name equals File name," in which "file dir and processes name, image_name" may be the projection and "Processes image_name equals File name" may be the filter. The search expression may retrieve or return results of file directories and process names in which a running process is combined with file information by correlating an image name. "Dir" and "image_name" may be further examples of keywords for the search request.

Figure 2:
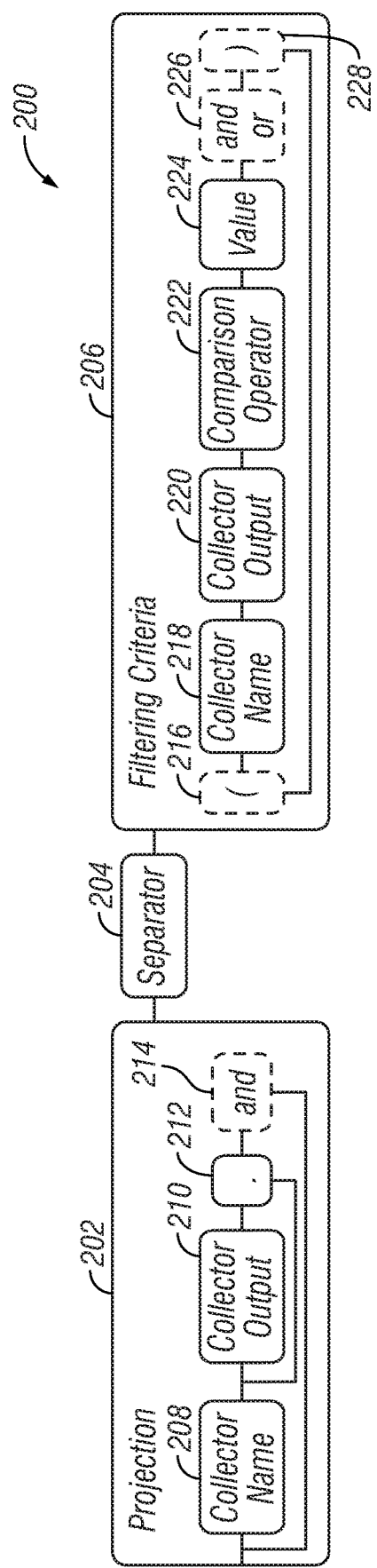
FIG. 2 is an illustration of a search expression with grammar and parsing of keywords for an extensible search solution, according to embodiments of the present disclosure.

FIG. 2 illustrates a search expression with grammar and parsing of keywords for an extensible search solution, according to embodiments of the present disclosure.

The search expression may include a projection 202, a separator 204, and filtering criteria 206. Separator 204 may delineate the search text associated with projection 202 and filtering criteria 206. Projection 202 may include one or more collectors. Filtering criteria 206 may include one or more filters. Although a projection, a separator, and filtering criteria are shown, any combination of collectors, operators, keywords, or strings suitable for an extensible search solution may be used.

Projection 202 may be referred to as the information to be retrieved or "what to get." Within projection 202, individual terms may be separated by AND operator 214. An individual term of projection 202 may include a parameter for the collector name(s) 208 and a parameter for the collector output 210. The parameter for the collector name(s) 208 may be a list of collectors. The parameter for the collector output 210 may specify the information to be produced to the collector output(s). The entries in the list may be separated by an appropriate grammatical construction, such as a comma as shown in 212.

Filtering criteria 206 may be referred to as a disjunction or a set of filters. Within filtering criteria 206, individual instances of filtering criteria, which may be also known as filters, may be separated using parentheses and operators. The parentheses, such as those shown as 216 and 228, may denote one or more individual filtering criteria. The operators, such as logical operators 226 and comparison operator 222, may specify the relationship between terms within an individual filtering criteria. Although certain operators are shown, any operators suitable for filtering may be used including, but not limited to AND, OR, or XOR. An individual instance of filtering criteria may include a collector name 218, a collector output 220, a comparison operator 222, and a criterion value 224. Thus, the "filtering criteria" may compare collector outputs with values.

For example, a search expression may be "Files name, md5 where Files dir contains 'downloads.'" Projection 202 may be "Files name, md5" and filtering criteria 206 may be "Files dir contains 'downloads.'" Within projection 202, "Files name" may be collector name 208, "md5" may be the collector output 210, and "," may be a grammatical construction 212. Within filtering criteria 206, "Files Dir" may be collector name 218, "contains" may be a comparison operator 222, and 'downloads' may be value 224. The search expression may result in the generation of a list of all files from the various clients. The list may be populated by MD5 hash values, which form the collector outputs 210. The list in turn may be filtered for those elements of the collector outputs whose files have a directory that contains the text string "downloads."

Moreover, special multi-value comparators may be used to specify certain sets of values. For example, "CurrentFlow port equals (80, 8080)" may specify that the collector output 220 of "CurrentFlow" has a value 224 for its port that is either "80" or "8080".

Furthermore, keywords may be used to specify well-known values, date data types, or relative values. For example, "CurrentFlow protocol equals tcp" may specify that the collector output 220 of "CurrentFlow" has a value for its protocol type that is Transmission Control Protocol (TCP), which may be a well-known value. In another example, "NetworkFlow time after last 2 hours" may filter the collector output "NetworkFlow" values for "time" within the past two hours. In yet another example, "NetworkFlow time after last 3 days and before last day" may filter the collector output "NetworkFlow" values for "time" within the past three days but before the past day.

When an administrator of the system determines that additional visibility is needed in order to adapt the search process to new threats, the AR application may allow the usage of custom collectors. Administrators may use custom collectors based on, for example, operating system commands, VisualBasic script parameters or operations, bash script parameters or operations, or Python script parameters or operations. These collectors may be used as part of searches. For example, a user of the AR application may create a custom collector named "My Collector" based upon operating system command content. The criteria may include a specification that the collector produces the output "out." The search parameter may state "MyCollector out where MyCollector out equals 'value.'" The information produced by MyCollector may be filtered by the specific value "out."

In another example, a user of the AR application may create the custom collector "MyCollector" and use it in combination with built-in or predefined collectors. For example, the search expression may be "Processes name and MyCollector out where MyCollector out equals 'value.'" A search using this expression may retrieve or get the information produced by MyCollector combined with the running processes on clients, and filtering for the specific output of MyCollector.

Figure 3:
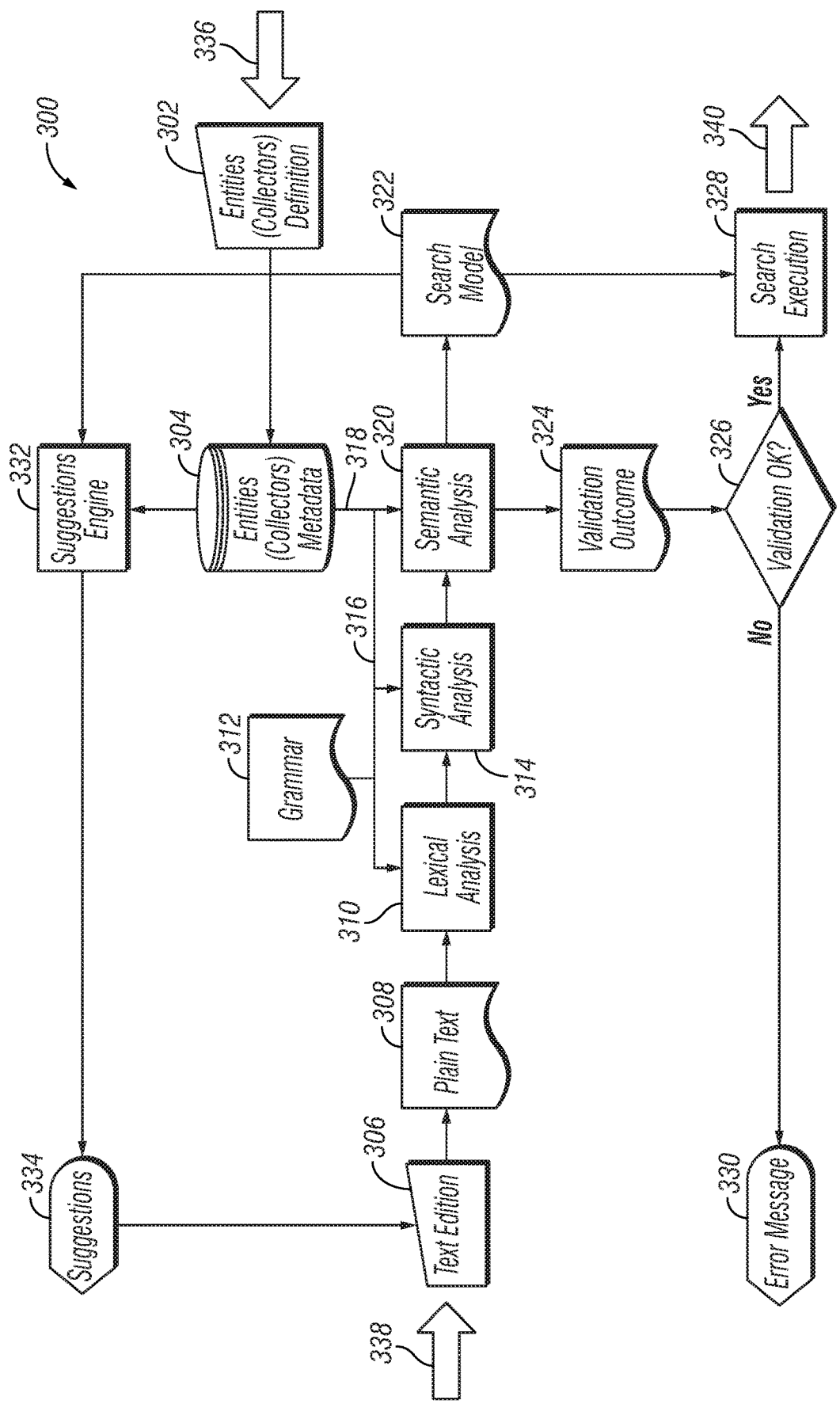
FIG. 3 is an illustration of operation of a system for extensible search of asset information, according to embodiments of the present disclosure.

FIG. 3 illustrates operation of a system 300 for extensible search of asset information, according to embodiments of the present disclosure. System 300 may implement search expression application 116 and search autocomplete and suggestion application 118, in whole or part.

In some embodiments, an input 336 for entities may be received. The input may define the entities, such as collectors, as shown by 302. Built-in or predefined collectors may be defined or customized collectors may be created. Metadata for the collectors may be stored in a database 304. Although a database is shown, any data structure suitable for storing metadata for the collectors may be used.

In some embodiments, an input 338 for a search may be received at text edition 306. Input 338 may be from a field of a GUI of an AR application. Input 338 may be entered, for example, by an administrator using the AR application. The text edition 306 may be converted to plain text at 308. The plaint text may be fed into lexical analysis routines 310. Lexical analysis routines 310 may use grammar definitions 312 for the search to parse the search input and return results. The parsed data may be received by syntactic analysis 314. Syntactic analysis 314 may evaluate the parsed data using grammar definitions from 312. The results of syntactic analysis may be received for semantic analysis at 320. Semantic analysis 320 may be based on the grammar definitions from 312 received via interface 316 and the metadata from 304 received via interface 318. The results of semantic analysis 320 may be received by search model 322 and validation outcome 324. Validation outcome 324 may validate the search, as semantically defined, to determine whether the search is properly formed or well-formed. If the validation outcome is okay at 326, search execution may occur at 328. However, if the validation is not okay at 326, an error message may be generated at 330.

The search model, as semantically defined, may be received by a suggestion engine 332 for future use, such as for future searches or future modifications to the analyzed search. The suggestion engine 332 may provide suggestions 334 to text edition 306. Suggestions 334 may be used for subsequent entry of search queries. Thus, system 300 may make it easier for a user to enter a search query without knowing the specific grammar, syntax, or semantics for executing searches.

Figure 4:
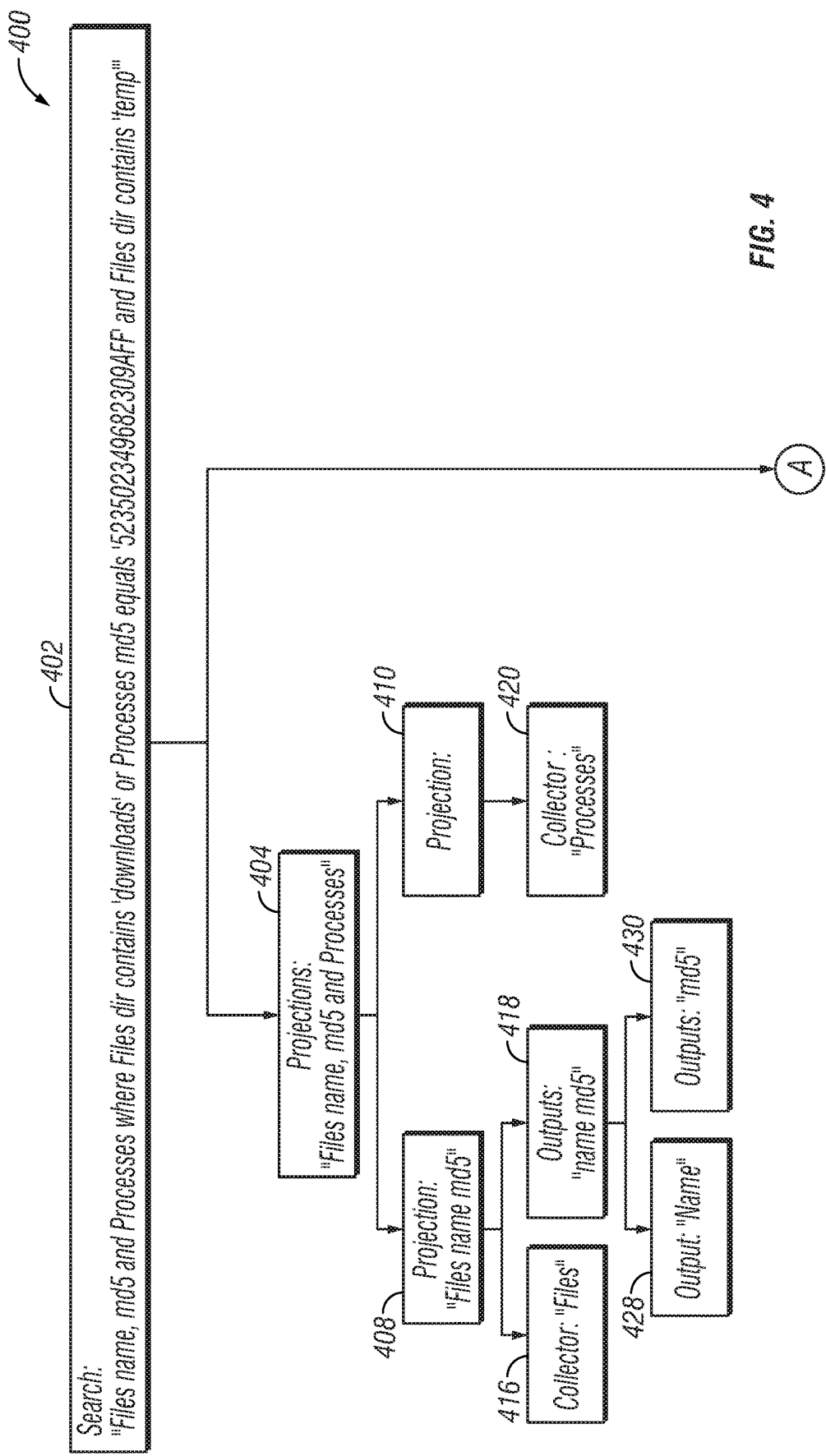
FIG. 4 is an object model of search operations of a system for extensible search of asset information, according to embodiments of the present disclosure.
Figure 4:
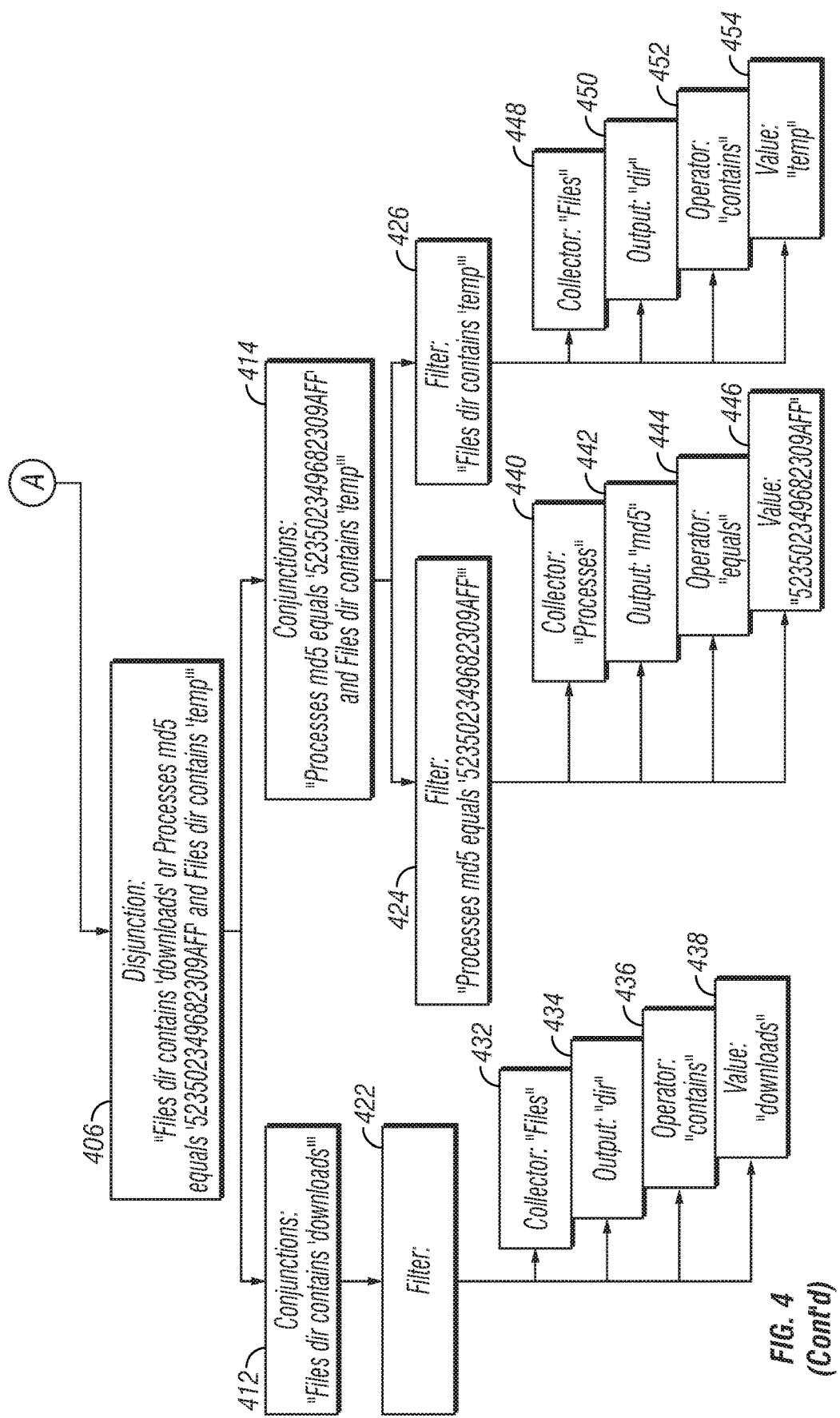

FIG. 4 is an object model of search operations of a system for extensible search of asset information, according to embodiments of the present disclosure. An example search may be "Files name, md5 and Processes where Files dir contains 'downloads' or Processes md5 equals '523402349682309AFF' and Files dir contains 'temp.'"

The example search may include projections 404, a separator, and a disjunction 406. The separator may be defined by a grammatical construction for introducing a clause, such as the word "where." The projection 404, which may contain the parameters to get or retrieve, may include one or more projections. The projection 404 may include the search text "Files name, md5 and Processes." The disjunction 406, which may be referred to as a filter, may include one or more disjunctions or filters. The disjunction 406 may include the search text "Files dir contains 'downloads' or Processes md5 equals '523402349682309AFF' and Files dir contains 'temp.'" Disjunction or filtering criteria 406 may include one or more filters.

Projection 404 may be determined to have two separate projections. A first projection 408 may include the search text "Files name, md5." First projection 408 may be determined to have a collector with one or more outputs. The collector 416 may include the search text "Files." Collector 416 may be associated with outputs 418. Outputs 418 may include two outputs, which may be referred to as output parameters. A first output 428 may include the search text "name" and the second output 430 may include the search text "md5." The output parameters may have an output "name" according to the format "md5." Thus, first projection 408 may specify that the "name" and "md5" values may be retrieved for the "Files" on the clients or endpoints. A second projection 410 may include the search text "Processes." Second projection 410 may be determined to have one collector and no outputs. Collector 420 may include the search text "Processes." Thus, second projection 410 may specify that data may be retrieved for the "Processes" on the clients or endpoints.

Disjunction 406 may be determined to have two conjunctions 412 and 414, which may be separated by a logical operator. Conjunction 412 may include one filter 422. A first filter 422 may include the search text "Files dir contains 'downloads.'" First filter 422 may include a collector 432, an output 434, an operator 436, and a value 438. Collector 432 may include the search text "Files," output 434 may include the search text "dir," operator 436 may include the search text "contains," and value 438 may include the search text 'downloads.' Thus, first filter 422 may filter files from the directory that contain the text "downloads."

Conjunction 414 may include two filters 424 and 426, which may be separated by a logical operator. A second filter 424 may include the search text "Processes md5 equals '523402349682309AFF.'" Second filter 424 may include a collector 440, an output 442, an operator 444, and a value 446. Collector 440 may include the search text "Processes," output 442 may include the search text "md5," operator 444 may include the search text "equals," and value 446 may include the search text "'523402349682309AFF.'" Thus, second filter 424 may filter processes that have an MD5 hash equivalent to a specific hash value.

A third filter 426 may include the search text "Files dir contains 'temp.'" Third filter 426 may include a collector 448, an output 450, an operator 452, and a value 454. Collector 448 may include the search text "Files," output 450 may include the search text "dir," operator 452 may include the search text "contains," and value 454 may include the search text 454. Thus, third filter 426 may filter files from the directory that contain the text "temp." The order of operations may be that the first filter is an "OR" operation against the "AND" operation of the second and third filters.

The search autocomplete and suggestion application may feed the GUI of the AR application. The suggestions and autocomplete actions may be based from prior searches. The collector names, outputs, and keywords may be suggested. Comparison operators may be suggested based on collector's output data types. A collector may be inferred from inputs. For example, given a user input of "md5," "File," "Processes," and "Network" may be suggested. Collector names and output may be inferred based upon input values. For example, when a user writes a hash value, all MD5 outputs may be suggested, followed by string suggestions.

Figure 5:
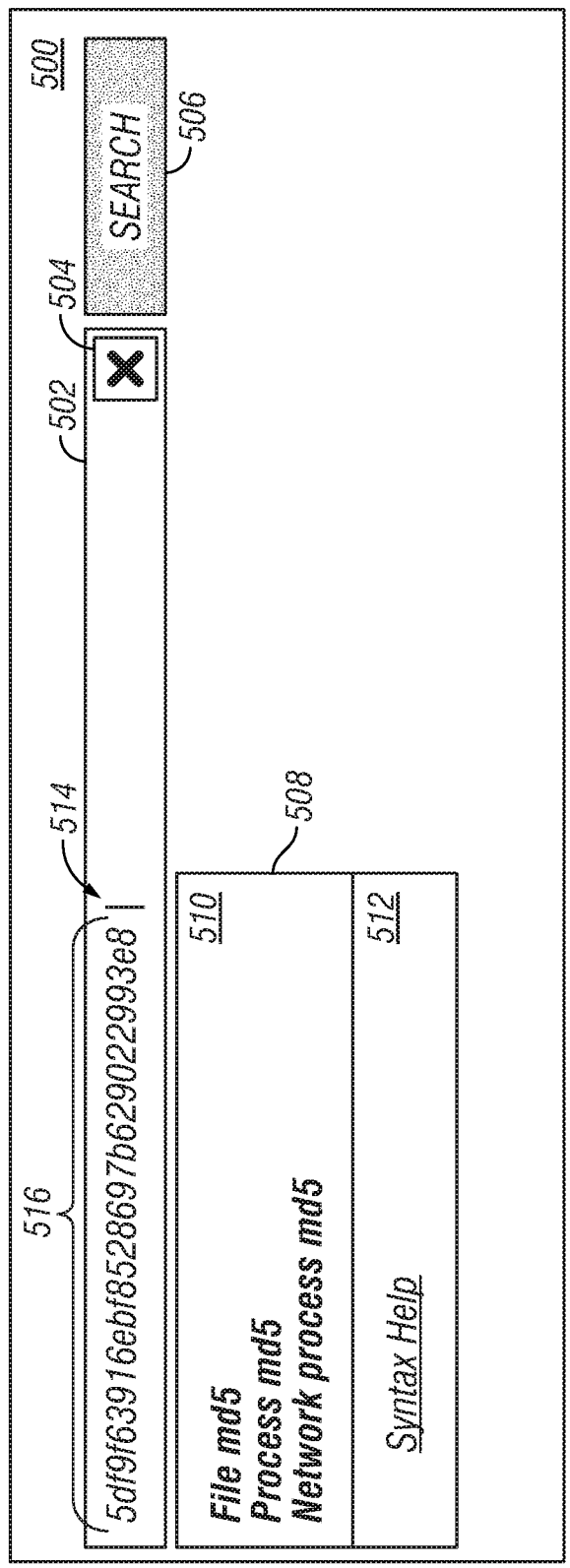
FIG. 5 is an illustration of example autocomplete and suggestions, according to embodiments of the present disclosure.

FIG. 5 illustrates example autocomplete and suggestions based upon input of a hash value, according to embodiments of the present disclosure. GUI 500 may include a search input box 502 with a status indicator 504, a search button 506, and a suggestion box 508. A user may enter a hash value of "5df9f63916ebf8528697b629022993e8" as the search text entry 516. Cursor 514 may remain at the end of the hash value entered. As a hash value alone may not be a sufficient search query, a red "X" may be displayed at 504, which may indicate that the search is not well-formed. Search button 506 may be greyed out to indicate that the search may not be performed. The suggestions box 508 may include a list of suggestions 510 and one or more links 512 to help with search text entry. Suggestions 510 may include valid changes to the search query so as to make it valid. Suggestions 510 may be based upon the fact that the search query contains a single hash value. A file, process, or network process and an identification of the MD5 format may be suggested. Suggestions 510 in suggestion box 508 may collectively represent possible collector operations that can be performed given the hash value. A user may select one of these with a mouse-click or navigation keystrokes.

Figure 6:
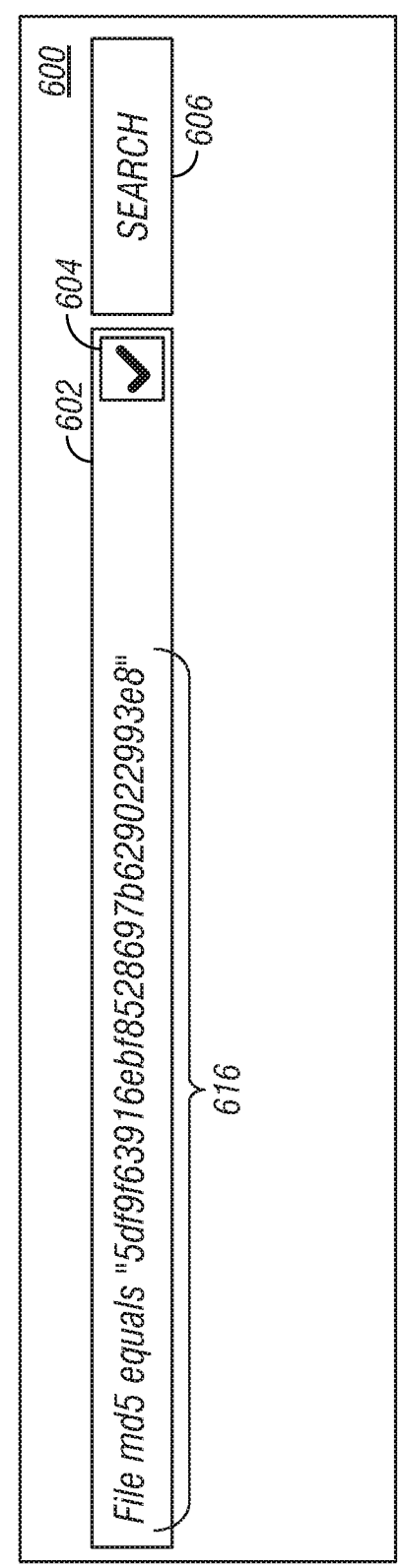
FIG. 6 is an illustration of the results for an exemplary user selection of a file hash, according to embodiments of the present disclosure.

FIG. 6 illustrates the results for an exemplary user selection of a file hash, according to embodiments of the present disclosure. The user may have selected the "File md5" suggestion from FIG. 5. The search query may be constructed from the existing hash value already input to the search bar and the selection of "File md5." The default formation of a search query may be that the "File md5" collector is assumed to be equal to the existing hash value. Thus, GUI 600 may include search box 602, which includes search text entry 616 that recites "File md5 equals '5df9f63916ebf528697b629022993e8.'" The red "X" may be changed to a green checkmark 604, which may indicate that the search is well-formed. The search button 606 may indicate that the search may be performed. Thus, the autocomplete and suggestion application may enable a user to perform a search using a hash value without any knowledge of the search syntax.

Figure 7:
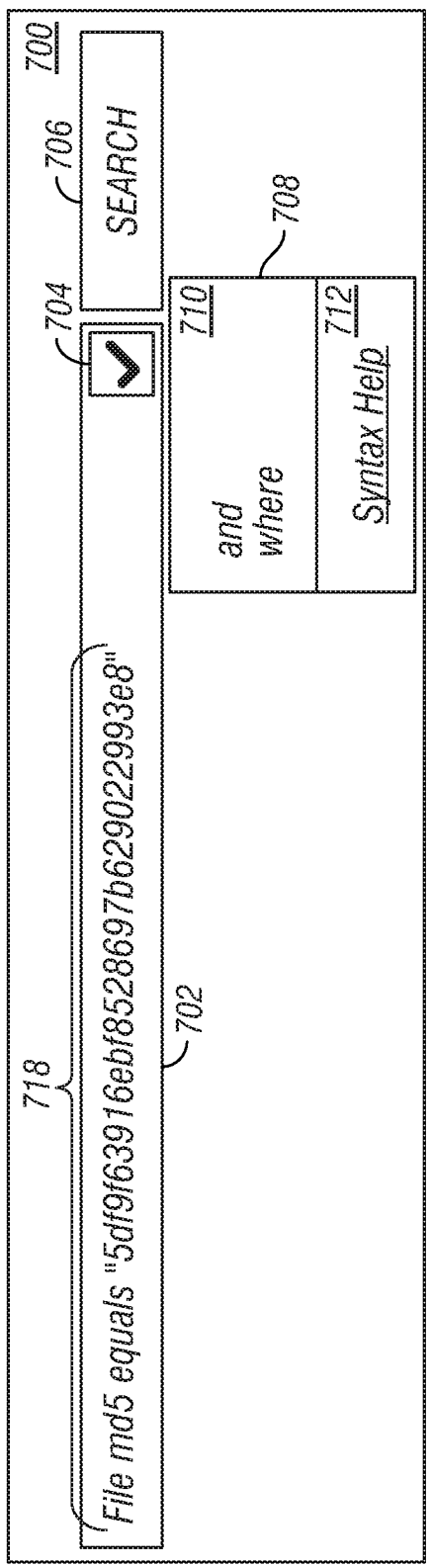
FIG. 7 is an illustration of example autocomplete and suggestions for a projection, according to embodiments of the present disclosure.

FIG. 7 illustrates example autocomplete and suggestions for a projection has been entered, according to embodiments of the present disclosure. The projection, also known as the information to get or retrieve, may include the search text "File md5 equals '5dP9f63916ebf528697b629022993e8.'" In some cases, FIG. 7 may illustrate suggestions that may be made based upon values completed in FIG. 6. GUI 700 may include search box 702 with search text 718. Search text 718 may be well-formed, which may result in green checkmark 704 and a search button 706. Suggestion box 708 may include suggestions 710 and links for syntax help 712. Suggestions 710 may be made even to well-formed search queries, such as search text entry 718. Suggestions 710 may include an "and" suggestion, in which additional terms for the projection operation may be entered for additional collectors. Suggestions 710 may include a "where" suggestion, to which the filtering criteria may be added.

Figure 8:
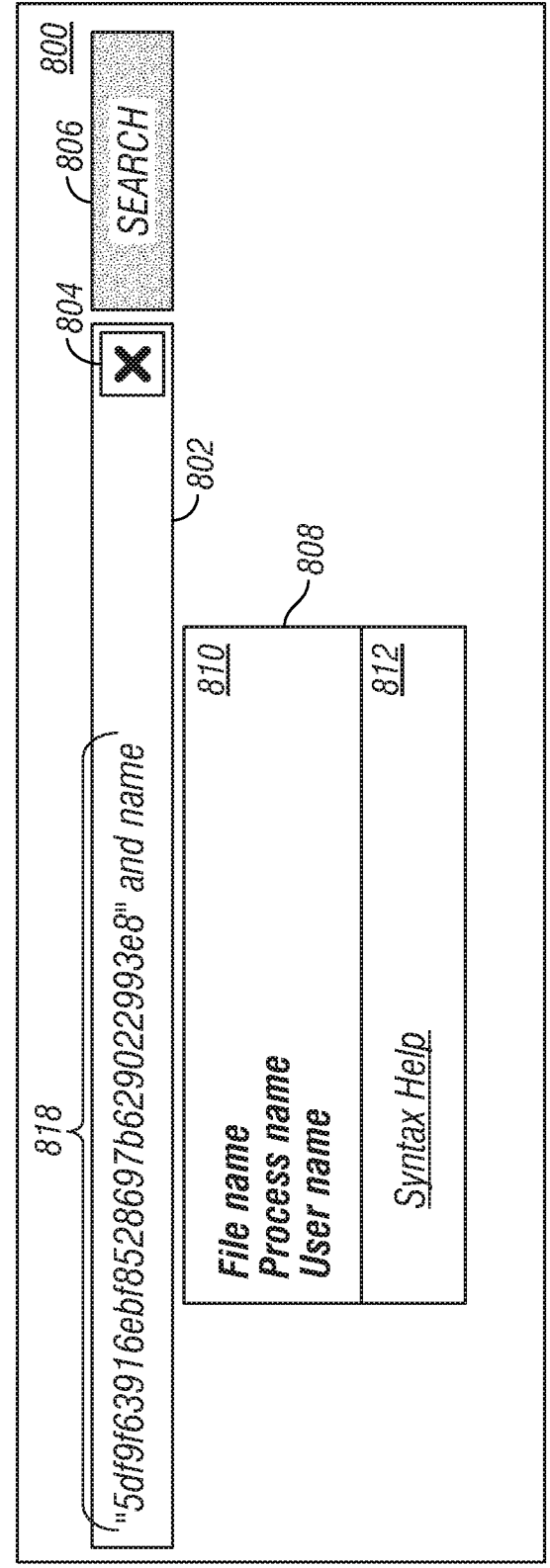
FIG. 8 is an illustration of autocomplete and suggestions for an exemplary hash value search input, according to embodiments of the present disclosure.

FIG. 8 illustrates autocomplete and suggestions for an exemplary hash value search input, according to embodiments of the present disclosure. The hash value search input may be appended with the denotation of a "name" field. GUI 800 may include a search box 802 with a search text entry 818, which may be "'5dP9f63916ebf8528697b629022993e8' and name." The red "X" 804 may be displayed, as a mere field reference of "name" (in addition to the hash value), without a reference to a known collector, may be an incorrectly formed search query. Thus, search button 806 may be greyed out. Suggestion box 808 may include suggestions 810 and links for syntax help 812. Suggestions 810 may be based on the "name" field, in which collectors that operate with such a field are shown. Suggestions 810 may include collectors that may operate based upon hash values and may include name fields. These suggestions may include file name, process name, or user name. Selection of a suggestion may result in a well-formed search query.

Figure 9:
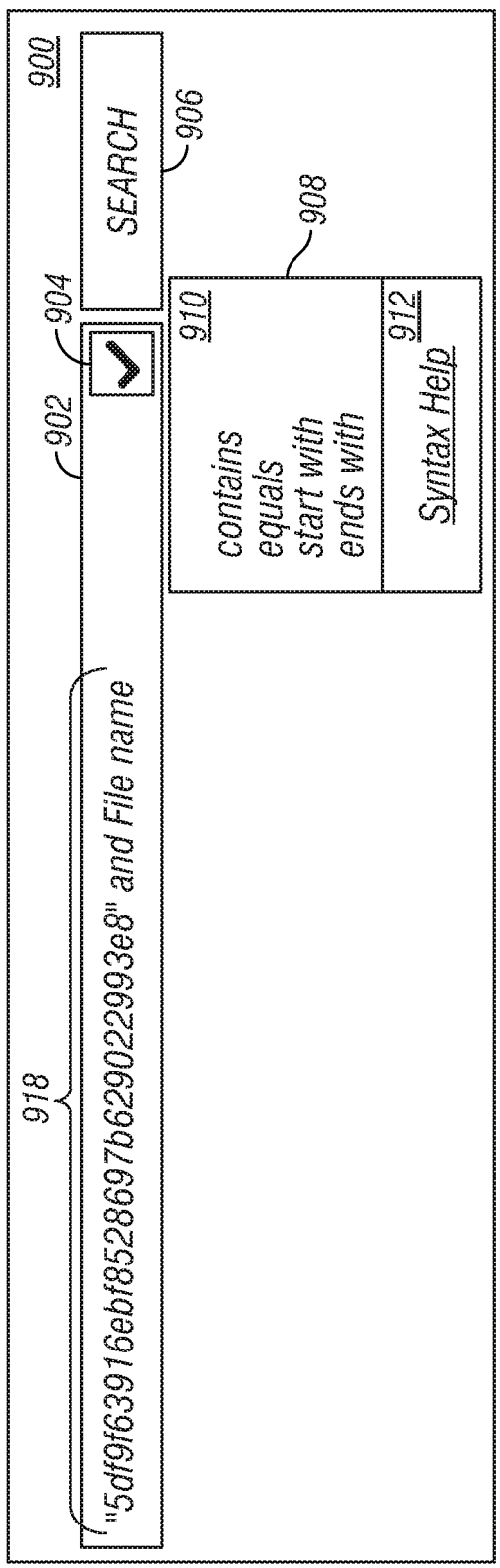
FIG. 9 is an illustration of the results for an exemplary user selection of a file name, according to embodiments of the present disclosure.

FIG. 9 illustrates the results for an exemplary user selection of a file name, according to embodiments of the present disclosure. The user may have selected "File name" in FIG. 8. Search text entry 918, which may now be well-formed in search box 902, may state "'5df9f63916e1A528697b629022993e8' and File name." Thus, green checkbox 904 and search button 906 may be shown. Suggestions 908 may include those operations that match a "File name" collector, which may be entered at the end of the search text entry. These suggestions 910 may include operations to further specify that the "File name" "contains," "equals," "starts with," or "ends with" further parameters or values.

Figure 10:
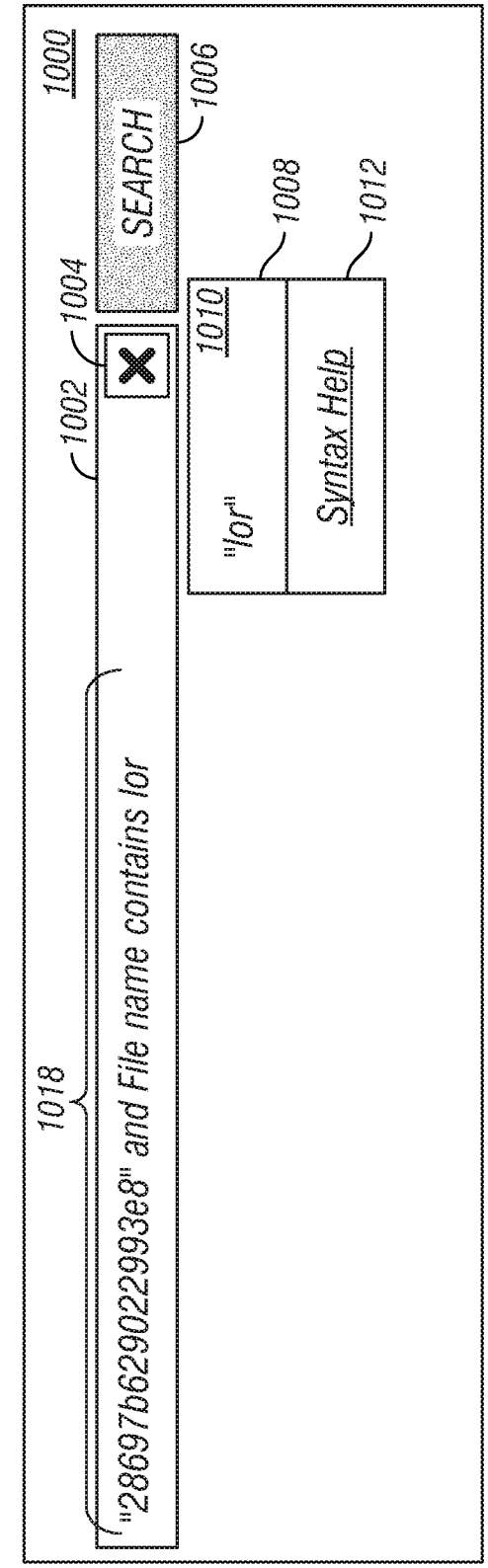
FIG. 10 is an illustration of autocomplete and suggestions for an exemplary input of a plurality of parameters, according to embodiments of the present disclosure.

FIG. 10 illustrates autocomplete and suggestions for an exemplary input of a plurality of parameters, according to embodiments of the present disclosure. FIG. 10 may illustrate options presented after selection of "contains" in FIG. 9. Search text entry 1018 may include the text "'5df9f63916ebf8528697b629022993e8' and File name contains lor." The text may be based on the input of a hash value, a file name collector, and a parameter that the file name includes a substring. A user may then input a substring of "lor" (but without the quotations). As the substring input at the end of entry 1018 may not be a recognized keyword, a red "X" 1004 and a greyed out search button 1006 may be shown. Suggestions 1010 may include a suggestion that this substring should be placed in quotes. Such a substring without quotes may be otherwise assumed to be a defined keyword.

FIG. 11 illustrates autocomplete and suggestions for an exemplary user selection of a suggested input, according to embodiments of the present disclosure. FIG. 11 may illustrate the selection of the substring with quotations in FIG. 10. Search text entry 1118 may be well-formed, which may result in a green checkbox 1104 and an enabled search box 1106. Suggestions 1110 may be shown with additional logical operations, such as "and" and or.

FIG. 12 illustrates the results for an exemplary search in which no such search results are found, according to embodiments of the present disclosure. GUI 1200 may be similar to GUI 1100 but after a search is performed. Search results box 1220 may indicate that no search results were found and that the user may receive search results by attempting to modify the search criteria in search box 1202.

Figure 13:
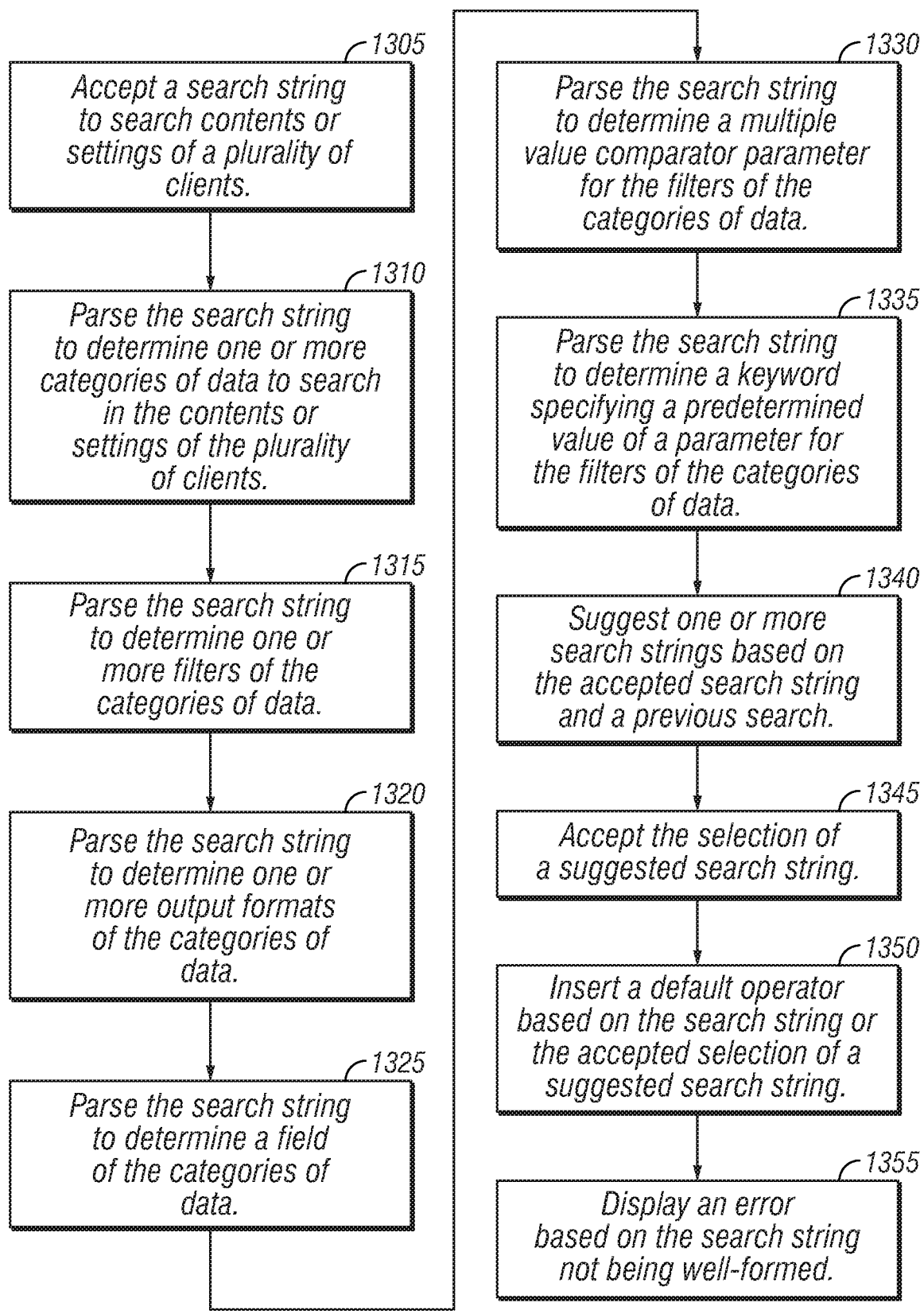
FIG. 13 is an illustration of an exemplary method for extensible search for asset information, according to embodiments of the present disclosure.

FIG. 13 illustrates a flow chart of an exemplary method for extensible search of asset information, according to embodiments of the present disclosure. Method 1300 may be implemented by any of the elements shown in FIGS. 1-12. Method 1300 may be initiated by any suitable criteria and may initiate operation at any suitable point. In one embodiment, method 1300 may initiate operation at 1305. Method 1300 may include greater or fewer actions than those illustrated. Moreover, method 1300 may execute its steps in an order different than those illustrated in FIG. 13. Method 1300 may terminate at any suitable point. Furthermore, method 1300 may repeat operation at any suitable point. Method 1300 may perform any of its actions in parallel with other actions of method 1300, or in other methods.

At 1305, in at least one embodiment a search string may be accepted. The search string may be for searching the contents or settings of a plurality of clients or endpoints. The search string may be accepted after entry of the text and may not require the acknowledgement of submission. At 1310, in at least one embodiment the search string may be parsed to determine one or more categories of data to search in the contents or settings of the plurality of clients. The categories of data may include one or more collectors, which may indicate what information to get or retrieve in a search. The categories of data may be referred to as one or more projections. The categories of data may include default, predefined, or predetermined categories and custom defined categories. Custom defined categories may be defined by a user.

At 1315, in at least one embodiment the search string may be parsed to determine one or more filters of the categories of data. The filters may collectively be referred to as filtering criteria. The filters may be separated from the categories of data by a keyword, such as the word "where." At 1320, in at least one embodiment the search string may be parsed to determine one or more output formats of the categories of data. At 1325, in at least one embodiment the search string may be parsed to determine a field of the categories of data. The field may include an output of the categories of data, such as the name of a file. At 1330, in at least one embodiment the search string may be parsed to determine a multiple-value comparator parameter for the filters of the categories of data. The multiple-value comparator parameter may specify the sets of values subject to a comparison.

At 1335, in at least one embodiment the search string may be parsed to determine a keyword specifying a predetermined value of a parameter for the filters of the categories of data. At 1340, in at least one embodiment one or more search strings may be suggested based on the accepted search string and a previous search. The suggestion may optionally include the accepted search string. At 1345, in at least one embodiment the selection of a suggested search string may be accepted. The search string may be modified to include the accepted suggested search string.

At 1350, in at least one embodiment a default operator may be inserted into the search string based on the search string or the accepted selection of a suggested search string. In an embodiment, the default operator may be a comparator. The insertion of the default operator may be in response to the search string not being well-formed. The search string may be well-formed after the inserted of the default operator. An evaluation of the search string to determine whether the search string is well-formed may include determining whether the entry of a hash value does not include an entry of a collector, whether the entry of a field does not include an entry of a collector, whether the entry of an operator does not include an entry of a collector, whether the entry of a value does not include an entry of quotation marks around the text, or any suitable determination to ensure that the search string is well-formed for performing a search. The search string may include the original search string, the suggested search string, a modified search string, or any combination thereof.

At 1355, in at least one embodiment an error may be displayed based on the search string not being well-formed. A search string may not be well-formed for any suitable reason including, but not limited to, the entry of a hash value without the entry of a collector, the entry of a field without the entry of a collector, the entry of an operator without the entry of a collector, or the entry of a value without quotation marks around the text. Method 1300 may optionally repeat or terminate.

The execution of the system may be implemented in any suitable number and kind of methods. The methods may begin at any suitable point, may repeat, and may reference each other. The methods may be implemented fully or in part by instructions on computer-readable media for execution by a processor. For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other electromagnetic and/or optical carriers; and/or any combination of the foregoing.

The following examples pertain to further embodiments. Specifics in the examples may be used anywhere in one or more embodiments described above or herein.

Embodiments of the present disclosure include at least one non-transitory machine readable storage medium. The medium may include computer-executable instructions. The instructions may be readable by a processor. The instructions, when read and executed, may cause the processor to accept a search string, parse the search string to determine a category of data, parse the search string to determine a filter of results of a search, recommend a suggested search string based on the accepted search string and a previous search, accept selection of the suggested search string, modify the search string in response to acceptance of the suggested search string, and perform the search of the contents or settings of the plurality of clients. The search string may be for searching contents or settings of a plurality of clients. The category of data may be for the searching to be performed. The search may include examining the contents or settings of the plurality of clients. The category of data in the search may be limited by at least the filter.

In combination with any of the above embodiments, in an embodiment the medium may further comprise instructions for causing the processor to parse the search string to determine an output format of the category of data to be searched in the contents or settings of the plurality of clients. The results of the search may be further limited by the output format. In combination with any of the above embodiments, in an embodiment the medium may further comprise instructions for causing the processor to parse the search string to determine a field of the category of data to be searched in the contents or settings of the plurality of clients. The results of the search may be further limited by the field. In combination with any of the above embodiments, in an embodiment the medium may further comprise instructions for causing the processor to parse the search string to determine a multiple-value comparator parameter for the filter of the results of the search. The results of the search may be further limited by the multiple-value comparator parameter. In combination with any of the above embodiments, in an embodiment the medium may further comprise instructions for causing the processor to parse the search string to determine a keyword, the keyword to specify a predetermined value of a parameter for the filter of the results of the search. The results of the search may be further limited by the keyword. In combination with any of the above embodiments, in an embodiment the medium may further comprise instructions for causing the processor to accept a definition of a customized category of data to be searched in the contents or settings of the plurality of clients. In combination with any of the above embodiments, in an embodiment the medium may further comprise instructions for causing the processor to insert a comparison operator into the modified search string. The modified search string with the comparison operator may be well-formed. In combination with any of the above embodiments, in an embodiment the medium may further comprise instructions for causing the processor to evaluate whether the modified search string is well-formed and display an error based on the search string not being well-formed. In combination with any of the above embodiments, in an embodiment the medium may further comprise instructions for causing the processor to evaluate whether the modified search string is well-formed, and insert a default operator into the modified search string in response to the modified search string not being well-formed. The modified search string with the default operator may be well-formed.

Embodiments of the present disclosure include a system for extensible search. The system may include a processor, at least one non-transitory machine readable storage medium communicatively coupled to the processor, and a search application. The search application may comprise instructions on the medium. The instructions may be readable by the processor. The search application may be configured to accept a search string to search contents or settings of a plurality of clients, parse the search string to determine a category of data, parse the search string to determine a filter of results of a search, recommend a suggested search string based on the accepted search string and a previous search, accept selection of the suggested search string, modify the search string in response to acceptance of the suggested search string, and perform the search of the contents or settings of the plurality of clients for the category of data as limited by at least the filter. The category data may be for the search of the contents or settings of the plurality of clients.

In combination with any of the above embodiments, in an embodiment the search application may be further configured to parse the search string to determine an output format of the category of data to be search in the contents or settings of the plurality of clients. The results of the search may be further limited by the output format. In combination with any of the above embodiments, in an embodiment the search application may be further configured to parse the search string to determine a field of the category of data to be search in the contents or settings of the plurality of clients. The results of the search may be further limited by the field. In combination with any of the above embodiments, in an embodiment the search application may be further configured to parse the search string to determine a multiple-value comparator parameter for the filter of the results of the search. The results of the search may be further limited by the output format. In combination with any of the above embodiments, in an embodiment the search application may be further configured to parse the search string to determine a keyword, the keyword to specify a predetermined value of a parameter for the filter of the results of the search. In combination with any of the above embodiments, in an embodiment the search application may be further configured to accept a definition of a customized category of data to be search in the contents or settings of the plurality of clients. In combination with any of the above embodiments, in an embodiment the search application may be further configured to insert a comparison operator into the modified search string. The modified search string with the comparison operator may be well-formed. In combination with any of the above embodiments, in an embodiment the search application may be further configured to evaluate whether the modified search string is well-formed and display an error based on the search string not being well-formed. In combination with any of the above embodiments, in an embodiment the search application may be further configured to evaluate whether the modified search string is well-formed, and insert a default operator into the modified search string in response to the modified search string not being well-formed. The modified search string with the default operator may be well-formed.

Embodiments of the present disclosure may include an apparatus. The apparatus may include means for accepting a search string to search contents or settings of a plurality of clients, means for parsing the search string to determine a category of data to be searched in the contents or settings of the plurality of clients, means for parsing the search string to determine a filter of results of a search of the contents or settings of the plurality of clients, means for recommending a suggested search string based on the accepted search string and a previous search, means for accepting selection of the suggested search string, means for modifying the search string in response to the means for accepting the suggested search string, and means for performing the search of the contents or settings of the plurality of clients for the category of data as limited by at least the filter.

In combination with any of the above embodiments, in an embodiment the apparatus may further include means for parsing the search string to determine an output format of the category of data to be searched in the contents or settings of the plurality of clients. The results of the search may be further limited by the output format. In combination with any of the above embodiments, in an embodiment the apparatus may further include means for parsing the search string to determine a field of the category of data to be searched in the contents or settings of the plurality of clients. The results of the search may be further limited by the field. In combination with any of the above embodiments, in an embodiment the apparatus may further include means for parsing the search string to determine a multiple-value comparator parameter for the filter of the results of the search. The results of the search may be further limited by the multiple-value comparator parameter. In combination with any of the above embodiments, in an embodiment the apparatus may further include means for parsing the search string to determine a keyword, the keyword to specify a predetermined value of a parameter for the filter of the results of the search. In combination with any of the above embodiments, in an embodiment the apparatus may further include means for accepting a definition of a customized category of data to be searched in the contents or settings of the plurality of clients. In combination with any of the above embodiments, in an embodiment the apparatus may further include means for inserting a comparison operator into the modified search string. The modified search string with the comparison operator may be well-formed. In combination with any of the above embodiments, in an embodiment the apparatus may further include means for evaluating whether the modified search string is well-formed, and means for displaying an error based on the search string not being well-formed. In combination with any of the above embodiments, in an embodiment the apparatus may further include means for evaluating whether the modified search string is well-formed and means for inserting a default operator into the modified search string in response to the modified search string not being well-formed. The modified search string with the default operator may be well-formed.

Embodiments of the present disclosure may include a method of extensible search. The method may include accepting a search string to search contents or settings of a plurality of clients, parsing the search string to determine a category of data to be searched in the contents or settings of the plurality of clients, parsing the search string to determine a filter of results of a search of the contents or settings of the plurality of clients, recommending a suggested search string based on the accepted search string and a previous search, accepting selection of the suggested search string, modifying the search string in response to acceptance of the suggested search string, and performing the search of the contents or settings of the plurality of clients for the category of data as limited by at least the filter.

In combination with any of the above embodiments, in an embodiment the method may further include parsing the search string to determine an output format of the category of data to be searched in the contents or settings of the plurality of clients. The results of the search may be further limited by the output format. In combination with any of the above embodiments, in an embodiment the method may further include parsing the search string to determine a field of the category of data to be searched in the contents or settings of the plurality of clients. The results of the search may be further limited by the field. In combination with any of the above embodiments, in an embodiment the method may further include parsing the search string to determine a multiple-value comparator parameter for the filter of the results of the search. The results of the search may be further limited by the multiple-value comparator parameter. In combination with any of the above embodiments, in an embodiment the method may further include parsing the search string to determine a keyword, the keyword to specify a predetermined value of a parameter for the filter of the results of the search. In combination with any of the above embodiments, in an embodiment the method may further include accepting a definition of a customized category of data to be searched in the contents or settings of the plurality of clients. In combination with any of the above embodiments, in an embodiment the method may further include recommending a suggested search string based on the accepted search string and a previous search. In combination with any of the above embodiments, in an embodiment the method may further include evaluating whether the modified search string is well-formed, and displaying an error based on the search string not being well-formed. In combination with any of the above embodiments, in an embodiment the method may further include evaluating whether the modified search string is well-formed and inserting a default operator into the modified search string in response to the modified search string not being well-formed. The modified search string with the default operator may be well-formed.

Although the forgoing has been described with respect to various embodiments, additions, variations, substitutions, and deletions may be made to the embodiments without departing from the scope and intent of the present disclosure.

What is claimed is:

1. At least one non-transitory machine-readable storage medium, comprising computer-executable instructions carried on the machine readable medium, the instructions readable by a processor, the instructions, when read and executed, for causing the processor to:
   accept, at a server, a user-entered search string to search contents or settings of a plurality of clients for vulnerabilities in the plurality of clients, wherein the user-entered search string includes a hash value and wherein each of the plurality of clients is a client computing device;
   parse the user-entered search string to determine a category of data to be searched in the contents or settings of the plurality of clients, wherein the category of data identifies the user-entered search string as including the hash value;
   parse the user-entered search string to determine a filter of results of a search of the contents or settings of the plurality of clients;
   recommend a suggested search string based on the accepted user-entered search string and a previous search, wherein the suggested search string includes a type of hash corresponding to the hash value;
   accept a selection of the suggested search string;
   modify the user-entered search string in response to acceptance of the selection of the suggested search string so that the user-entered search string includes the hash value and the type of hash value corresponding to the hash value; and
   perform a search of the contents or settings of the plurality of clients for the category of data as limited by at least the filter.

2. The medium of claim 1, further comprising instructions for causing the processor to:
   parse the user-entered search string to determine an output format of the category of data to be searched in the contents or settings of the plurality of clients; and
   wherein the results of the search are further limited by the output format.

3. The medium of claim 1, further comprising instructions for causing the processor to:
   parse the user-entered search string to determine a field of the category of data to be searched in the contents or settings of the plurality of clients;
   wherein the results of the search are further limited by the field.

4. The medium of claim 1, further comprising instructions for causing the processor to:
   parse the user-entered search string to determine a multiple-value comparator parameter for the filter of the results of the search; and
   wherein the results of the search are further limited by the multiple-value comparator parameter.

5. The medium of claim 1, further comprising instructions for causing the processor to:
   parse the user-entered search string to determine a keyword, the keyword to specify a predetermined value of a parameter for the filter of the results of the search; and
   wherein the results of the search are further limited by the keyword.

6. The medium of claim 1, further comprising instructions for causing the processor to accept a definition of a customized category of data to be searched in the contents or settings of the plurality of clients.

7. The medium of claim 1, further comprising instructions for causing the processor to insert a comparison operator into the modified user-entered search string, wherein the modified user-entered search string with the comparison operator is well-formed.

8. A system for extensible search, comprising:
a processor;
at least one non-transitory machine-readable storage medium communicatively coupled to the processor;
a search application comprising computer-executable instructions on the medium, the instructions readable by the processor, the search application configured to:
accept, at a server, a user-entered search string to search contents or settings of a plurality of clients for vulnerabilities in the plurality of clients, wherein the user-entered search string includes a hash value and wherein each of the plurality of clients is a client computing device;
parse the user-entered search string to determine a category of data to be searched in the contents or settings of the plurality of clients, wherein the category of data identifies the user-entered search string as including the hash value;
parse the user-entered search string to determine a filter of results of a search of the contents or settings of the plurality of clients;
recommend a suggested search string based on the accepted user-entered search string and a previous search, wherein the suggested search string includes a type of hash corresponding to the hash value;
accept selection of the suggested search string;
modify the user-entered search string in response to acceptance of the selection of the suggested search string so that the user-entered search string includes the hash value and the type of hash value corresponding to the hash value; and
perform a search of the contents or settings of the plurality of clients for the category of data as limited by at least the filter.

9. The system of claim 8, wherein the search application is further configured to:
parse the user-entered search string to determine an output format of the category of data to be searched in the contents and settings of the plurality of clients; and
wherein the results of the search are further limited by the output format.

10. The system of claim 8, wherein the search application is further configured to:
parse the user-entered search string to determine a field of the category of data to be searched in the contents or settings of the plurality of clients; and
wherein the results of the search are further limited by the output format.

11. The system of claim 8, wherein the search application is further configured to:
parse the user-entered search string to determine a multiple-value comparator parameter for the filter of the results of the search; and
wherein the results of the search are further limited by the multiple-value comparator parameter.

12. The system of claim 8, wherein the search application is further configured to parse the user-entered search string to determine a keyword, the keyword to specify a predetermined value of a parameter for the filter of the results of the search.

13. The system of claim 8, wherein the search application is further configured to accept a definition of a customized category of data to be search in the contents or settings of the plurality of clients.

14. The system of claim 8, wherein the search application is further configured to insert a comparison operator into the modified user-entered search string, wherein the modified user-entered search string with the comparison operator is well-formed.

15. A method of extensible search, comprising:
accepting, at a server, a user-entered search string to search contents or settings of a plurality of clients for vulnerabilities in the plurality of clients, wherein the user-entered search string includes a hash value and wherein each of the plurality of clients is a client computing device;
parsing the user-entered search string to determine a category of data to be searched in the contents or settings of the plurality of clients, wherein the category of data identifies the user-entered search string as including the hash value and a type of hash corresponding to the hash value;
parsing the user-entered search string to determine a filter of results of a search of the contents or settings of the plurality of clients;
recommending a suggested search string based on the accepted user-entered search string and a previous search, wherein the suggested search string includes a type of hash corresponding to the hash value
accepting selection of the suggested search string;
modifying the user-entered search string in response to acceptance of the selection of the suggested search string so that the user-entered search string includes the hash value and the type of hash value corresponding to the hash value; and
performing a search of the contents or settings of the plurality of clients for the category of data as limited by at least the filter.

16. The method of claim 15, further comprising:
parsing the user-entered search string to determine an output format of the category of data to be searched in the contents or settings of the plurality of clients; and
wherein the results of the search are further limited by the output format.

17. The method of claim 15, further comprising:
parsing the user-entered search string to determine a field of the category of data to be searched in the contents or settings of the plurality of clients; and
wherein the results of the search are further limited by the field.

18. The method of claim 15, further comprising:
parsing the user-entered search string to determine a multiple-value comparator parameter for the filter of the results of the search; and
wherein the results of the search are further limited by the multiple-value comparator parameter.

19. The method of claim 15, further comprising accepting a definition of a customized category of data to be searched in the contents or settings of the plurality of clients.

20. The method of claim 15, further comprising inserting a comparison operator into the modified user-entered search string, wherein the modified user-entered search string with the comparison operator is well-formed.

* * * * *